(12) United States Patent
Ewers

(10) Patent No.: US 12,398,820 B2
(45) Date of Patent: Aug. 26, 2025

(54) INSERT ARRANGEMENT AND A METHOD OF ASSEMBLING A DAMPING ARRANGEMENT

(71) Applicant: Advanced Suspension Technology LLC, Northville, MI (US)

(72) Inventor: Benny Ewers, Upplands Väsby (SE)

(73) Assignee: Advanced Suspension Technology LLC, Northville, MI (US)

( * ) Notice: Subject to any disclaimer, the term of this patent is extended or adjusted under 35 U.S.C. 154(b) by 8 days.

(21) Appl. No.: 18/370,601

(22) Filed: Sep. 20, 2023

(65) Prior Publication Data

US 2024/0102576 A1 Mar. 28, 2024

(30) Foreign Application Priority Data

Sep. 23, 2022 (EP) .................................. 22197427

(51) Int. Cl.
*F16K 27/02* (2006.01)
*F16F 15/03* (2006.01)
*F16K 31/06* (2006.01)

(52) U.S. Cl.
CPC ............ *F16K 27/029* (2013.01); *F16F 15/03* (2013.01); *F16K 31/0655* (2013.01); *F16F 2222/06* (2013.01)

(58) Field of Classification Search
USPC ............. 251/129.01, 129.15, 366; 188/322.2
See application file for complete search history.

(56) References Cited

U.S. PATENT DOCUMENTS

| 4,809,749 | A |   | 3/1989  | Ichihashi |                |
|-----------|---|---|---------|-----------|----------------|
| 5,467,851 | A | * | 11/1995 | Handke    | F16F 9/465     |
|           |   |   |         |           | 267/179        |
| 5,651,433 | A | * | 7/1997  | Wirth     | F16F 9/325     |
|           |   |   |         |           | 188/266.6      |
| 6,000,508 | A | * | 12/1999 | Forster   | F16F 9/46      |
|           |   |   |         |           | 188/299.1      |
| 7,604,101 | B2| * | 10/2009 | Park      | F16F 9/465     |
|           |   |   |         |           | 188/315        |

(Continued)

FOREIGN PATENT DOCUMENTS

DE 112020006079 T5 9/2022
FR 2613798 A1 10/1988

*Primary Examiner* — Matthew W Jellett
(74) *Attorney, Agent, or Firm* — Harness, Dickey & Pierce, P.L.C.

(57) ABSTRACT

The present application relates to an insert arrangement for engaging with a solenoid arrangement and for closing a valve cavity of a damping arrangement. The insert arrangement comprises: an armature member adapted in shape and size to provide a base portion and an axial portion extending out of the base portion in a direction parallel to a first axis, a casing member adapted to extend around the axial portion to define a receiving space between the axial portion and the casing member. The solenoid arrangement is at least partly arrangeable in said receiving space, and the casing member is further adapted with a magnetically conducting material for substantially closing a magnetic field generated by the solenoid arrangement. The insert arrangement further comprises fixating means for fixating the armature member to the damping arrangement, wherein said fixating means are arranged on the casing member.

14 Claims, 8 Drawing Sheets

(56) References Cited

U.S. PATENT DOCUMENTS

| | | | | |
|---|---|---|---|---|
| 8,181,757 | B2 * | 5/2012 | Heyn | F16F 9/46 |
| | | | | 188/266.2 |
| 8,220,604 | B2 * | 7/2012 | Jee | F16F 9/325 |
| | | | | 188/266.6 |
| 8,469,162 | B2 * | 6/2013 | Nishimura | F16F 9/325 |
| | | | | 188/266.2 |
| 8,770,363 | B2 * | 7/2014 | Sonsterod | F16F 9/34 |
| | | | | 251/337 |
| 2016/0195152 | A1 | 7/2016 | Mori et al. | |
| 2016/0223043 | A1 | 8/2016 | Hagidaira et al. | |
| 2018/0266514 | A1 | 9/2018 | Mori | |
| 2021/0033163 | A1 | 2/2021 | Nakano et al. | |

* cited by examiner

INSERT ARRANGEMENT AND A METHOD OF ASSEMBLING A DAMPING ARRANGEMENT

CROSS-REFERENCE TO RELATED APPLICATION

This application claims the benefit and priority of European application number 22197427.2 filed Sep. 23, 2022. The entire disclosure of the above application is incorporated herein by reference.

FIELD

The present disclosure relates to an insert arrangement for engaging with a solenoid arrangement and for closing a valve cavity of a damping arrangement, a damping arrangement comprising such an insert arrangement and a method of assembling a damping arrangement.

BACKGROUND

Damping characteristics of damping arrangements can be actively controlled by means of a solenoid arrangement. A solenoid arrangement is typically adapted to be arranged into an armature member to be inserted into an end of a valve cavity. Typically, the armature member is fixated to the valve cavity using threads that engage with corresponding threads located on an inner wall of the valve cavity. To minimize magnetic losses, it is preferable to enclose the magnetic field by means of a casing member comprising a magnetically conducting material.

There are generally two solutions of incorporating such a casing member in a damping arrangement.

In one known solution, the casing member can be incorporated in the wall of a valve cavity of the damping arrangement. This solution limits materials that can be used in the wall of the valve cavity, for instance it cannot be made in aluminum. Moreover, this solution also requires very tight air gap tolerances between armature and cavity wall so as to hinder hydraulic fluid leakage.

Alternatively, the casing member may be integrated in a base portion of the armature member. This solution however requires the armature member to be manufactured in a plurality of pieces to be assembled together after manufacturing, thereby increasing cost of manufacturing and assembly. Moreover, this solution requires that there are very tight air gap tolerances between casing member and cavity wall so as to hinder hydraulic fluid leakage.

There is thus a need for an improved solution of how to incorporate a casing member in a damping arrangement that is both cost effective and easy to assemble.

SUMMARY

It is an object of the present disclosure to provide an improved solution that alleviates the mentioned drawbacks with present solutions. Furthermore, it is an object to provide an insert arrangement comprising a casing member and armature member for arrangement to a damping arrangement, which insert arrangement is easy to assemble in place. An additional object is to provide an insert arrangement can be manufactured cost effectively. A further object is to provide a method of arranging an insert arrangement to a damping arrangement.

According to a first aspect of the disclosure, an insert arrangement for engaging with a solenoid arrangement and for closing a valve cavity of a damping arrangement is provided. The insert arrangement comprises: an armature member adapted in shape and size to provide a base portion and an axial portion extending out of the base portion in a direction parallel to a first axis. The base portion is adapted to provide a mating surface for mating with an inner wall of the valve cavity when the insert arrangement is arranged to close the valve cavity. The axial portion is adapted to define an inner space for receiving and allowing an actuation member to be axially moveable therein to interact with a valve arrangement of the damping arrangement under influence of a magnetic field generated by the solenoid arrangement. The insert arrangement further comprises a casing member adapted to extend around the axial portion to define a receiving space between the axial portion and the casing member, and the solenoid arrangement is at least partly arrangeable in said receiving space. The casing member is further adapted with a magnetically conducting material for substantially closing a magnetic field generated by the solenoid arrangement. The insert arrangement further comprises fixating means for fixating the armature member to the damping arrangement. Said fixating means are arranged on the casing member. Said mating surface is axially located between an insert end of the insert arrangement and said fixating means.

A first advantage is a facilitated assembly of the insert arrangement in a damping arrangement. Conventionally, fixating means such as threads are located on a base portion of the armature member. By rather arranging them on the casing member, which is arranged to engage with the armature member, the insert arrangement is securable by operation of the casing member. This allows direct line of sight of verifying if the insert arrangement is correctly placed before securing it to the damping arrangement. Another advantage is that, by removing the fixation means from the armature member, a relatively larger mating surface for mating with the inner wall of the valve cavity is provided. This mating surface may for instance be used for providing a groove for holding a sealing member to seal the valve cavity. Another advantage of providing the threads on a casing member rather than on the base portion of the armature member is that the armature member has simpler design and may thus be formed as a single part.

For the purpose of clarifying some terms and wordings used herein, some clarifications are provided in the following.

In the context of this application, by the term "part", it may be meant a separate element. For example, a first feature and a second feature, when referenced as different parts, may be understood as being structurally separate features, either separated in space or arranged together with a distinct boundary therebetween. By the term "portion", it may be meant an area or a region of an element. For example, a first feature and a second feature, when referenced as different portions, may be understood as being different and optionally non-overlapping regions of a single element. By the phrase "at least partly" or "at least partially", it may refer to one or more parts and/or one or more portion of an element. For example, an element at least partly moveable may be understood to have one or more parts or one or more portions that is moveable relative to some other referenced feature.

By fluidly arranged, coupled, or connected or the like, it may be meant that a first feature and a second feature are directly or indirectly connected so as to establish a fluid flow path between the first feature and the second feature, and not that a first feature is floating relative a second feature.

By restricting, it may be meant an act of adjusting the dimensions of a fluid flow opening. The dimensions of the fluid flow opening may be increased or decreased, thereby impacting the hydraulic fluid flow flowing through the fluid flow opening. A restriction may therefore be understood as a dimension-adjustable fluid flow opening. A restriction may be an adjustable space between two or more elements which can be mutually moved relative each other to adjust said adjustable space.

Additional optional features of the disclosure according to the first aspect is detailed in the following.

The insert arrangement is adapted to be at least partly inserted in a valve cavity. The valve cavity may be formed by a damping arrangement, or the like. The valve cavity may be defined by a valve cavity wall. The valve cavity wall may be a part or portion of the damping arrangement. The valve cavity wall may be a part or portion of a cylinder member. The cylinder member may be a part or portion of the damping arrangement. The cylinder member may define a center axis. The valve cavity wall of the cylinder member may be substantially cylindrical about the center axis. The cylinder member may define an insert opening at one axial end. The insert arrangement may be adapted to be inserted at least partly or fully into the valve cavity via said insert opening. The valve cavity wall may define a first inner wall portion axially displaced from a second inner wall portion. The first inner wall portion and the second inner wall portion may be radially offset each other from a center axis. The valve cavity may be fluidly connected to a working chamber of a damping arrangement, such as a shock absorber.

The armature member is adapted for engaging with the solenoid arrangement. The armature member may be adapted in shape and size to provide a base portion. The armature member may be adapted in shape and size to provide an axial portion extending out of the base portion. The axial portion may extend out of the base portion in a direction parallel to a first axis. The first axis may be parallel and optionally concentric with aforementioned centre axis of the valve cavity. The base portion may comprise a substantially cylindrical shape. The axial portion may comprise a substantially cylindrical shape. The axial portion may be concentric with the base portion.

The base portion may be adapted to provide a mating surface for mating with an inner wall of the valve cavity when the insert arrangement is arranged to close the valve cavity. By mating surface, it may be meant a surface adapted to engage with an inner wall surface so that the gap there between is less than a predetermined gap distance. The predetermined gap distance may be less than 1 mm, for instance be in the interval of 0.1 mm-0.2 mm, 0.2 mm-0.3 mm, 0.3 mm-0.4 mm, 0.4 mm-0.5 mm, 0.5 mm-0.6 mm, 0.6 mm-0.7 mm, 0.7 mm-0.8 mm, 0.8 mm-0.9 mm, or 0.9 mm-1.0 mm, or in an interval formed from a combination of the above intervals. The mating surface may extend in a direction parallel to a centre axis of the armature member. The mating surface may extend partly or fully in a circumferential direction of the base portion. In the case of the base portion having a substantially cylindrical shape, the mating surface may extend in a circumferential direction of the base portion at a constant radius.

The insert arrangement is adapted for closing a valve cavity of a damping arrangement. The damping arrangement may be a damping arrangement for controlling pressure of a hydraulic fluid for flowing in a cylinder of a damping arrangement, such as a shock absorber.

The insert arrangement comprises a casing member. The casing member may be adapted for engaging with or connecting to the armature member. The casing member may be adapted to be a separate member from the armature member. The casing member may be adapted to have a generally cylindrical shape with a first axial end for engaging with the armature member and a second axial end for engaging with the solenoid arrangement. The casing member may be adapted with a receiving portion arranged on an inner side of the casing member defining a through hole through which the axial portion of the armature member may be inserted.

According to one embodiment, the insert arrangement is further adapted with a groove in the mating surface for receiving a sealing member therein. The sealing member is adapted to hinder hydraulic fluid from leaking out of the valve cavity when the insert arrangement is arranged to close the valve cavity. By providing a sealing member as such, gap tolerances between the mating surface and inner wall of the valve cavity may be less strict. By hinder hydraulic fluid from leaking, it may mean that it reduces the leakage or substantially stop it fully. Over time, the sealing member may degrade, thereby reducing its ability to hinder leakage.

According to one embodiment, the base portion and the axial portion of the armature member are formed as a single part. By this, the armature member may be more easily manufactured which may reduce cost. Further, no additional assembly is required of the armature member.

According to one embodiment, the casing member is a separate part from the armature member. By this, the casing member may be enabled to move relative the armature member in order to secure the insert arrangement to a damper arrangement.

According to one embodiment, the fixating means comprise threads adapted to engage with corresponding threads arranged on the inner wall of the valve cavity. By this, the casing member is capable of securing the insert arrangement to a damping arrangement by means of rotating the casing member about a center axis of the insert arrangement. Fixing and securing may be used interchangeably in this application text. The fixating means may be referenced as securing means.

According to one embodiment, the insert arrangement further comprises a sealing member adapted to be arranged in the groove of the mating surface and to hinder hydraulic fluid from leaking out of the valve cavity when the insert arrangement is arranged to close the valve cavity. By incorporating the sealing member as well, the insert arrangement may be provided as a pre-assembled kit of parts for insertion into a valve cavity of a damping arrangement.

According to one embodiment, the casing member and the base portion of the armature member are adapted with substantially cylindrical geometry, and the casing member and the base portion are characterized by respective outer diameters wherein the outer diameter of the casing member is larger than the outer diameter of the base member.

According to one embodiment, the base portion and the axial portion are concentrical. By this, the casing member may be arranged concentrically about a center axis, thereby facilitating it to rotatably secure the insert arrangement to a damping arrangement by means of threads.

According to one embodiment, the axial portion is adapted with a latch recess for receiving a latch member of the solenoid member. By this, the solenoid arrangement may be secured in place to the insert arrangement. Alternatively, or in combination, the solenoid arrangement may be adapted to be secured to the insert arrangement by other fixation means such as threads.

According to one embodiment, the casing member is adapted to engage with the base portion of the armature member in a press fit manner.

According to a second aspect of the disclosure, a damping arrangement is provided. The damping arrangement comprises: a valve cavity, an insert arrangement according to the first aspect or any embodiments thereof, which insert arrangement is arranged to close the valve cavity; a solenoid arrangement arranged at least partly in the receiving space of the insert arrangement; a valve arrangement, and an actuation member axially moveable in the inner space of the axial portion of the armature member to interact with the valve arrangement under influence of a magnetic field generated by the solenoid arrangement. The damping arrangement may comprise a solenoid arrangement arranged to engage with the insert arrangement.

According to one embodiment, the damping arrangement further comprises a sealing member arranged in the groove located in the mating surface of the base portion of the armature member for hindering hydraulic fluid from leaking out of the valve cavity when the insert arrangement is arranged to close the valve cavity.

According to a third aspect, a method of assembling a damping arrangement is provided. The method comprises the steps of: providing a damping arrangement adapted with a valve cavity; providing an insert arrangement comprising an armature member and a valve arrangement; inserting the insert arrangement into the valve cavity such that a mating surface of a base portion of the armature member mates with an inner wall of the valve cavity, thereby closing the valve cavity in a closing position; fixating the insert arrangement in the closing position by means of fixating means provided on a casing member adapted for engaging with threads provided on an inner wall of the valve cavity; arranging a solenoid arrangement in a receiving space formed between the casing member and an axial portion extending out of the base portion of the armature member.

According to one embodiment, the method further comprises the step of providing, prior to the step of inserting the insert arrangement into the valve cavity, a sealing member in a groove located in the mating surface.

According to one embodiment, the method further comprises the step of providing, prior to inserting the insert arrangement in the valve cavity, an assembly element into the valve cavity to cover said threads in the valve cavity and removing the assembly element before fixating the insert arrangement in the closing position by means of said fixating means. The assembly element may protect the threads of the insert arrangement or the damping arrangement during assembly. The assembly element may be a protective cover which may have deformable characteristics. By this, it may be deformed to conform with the geometry of the valve cavity and/or the insert arrangement. The assembly element may be adapted to be removed after the insert arrangement has been inserted but prior to rotating the casing member to fixate or secure the insert arrangement via said threads.

The disclosure is defined by the appended independent claims, with embodiments being set forth in the appended dependent claims, in the following description and in the drawings.

BRIEF DESCRIPTION OF THE DRAWINGS

The disclosure will in the following be described in more detail with reference to the enclosed drawings, wherein.

DESCRIPTION

Figure 1:
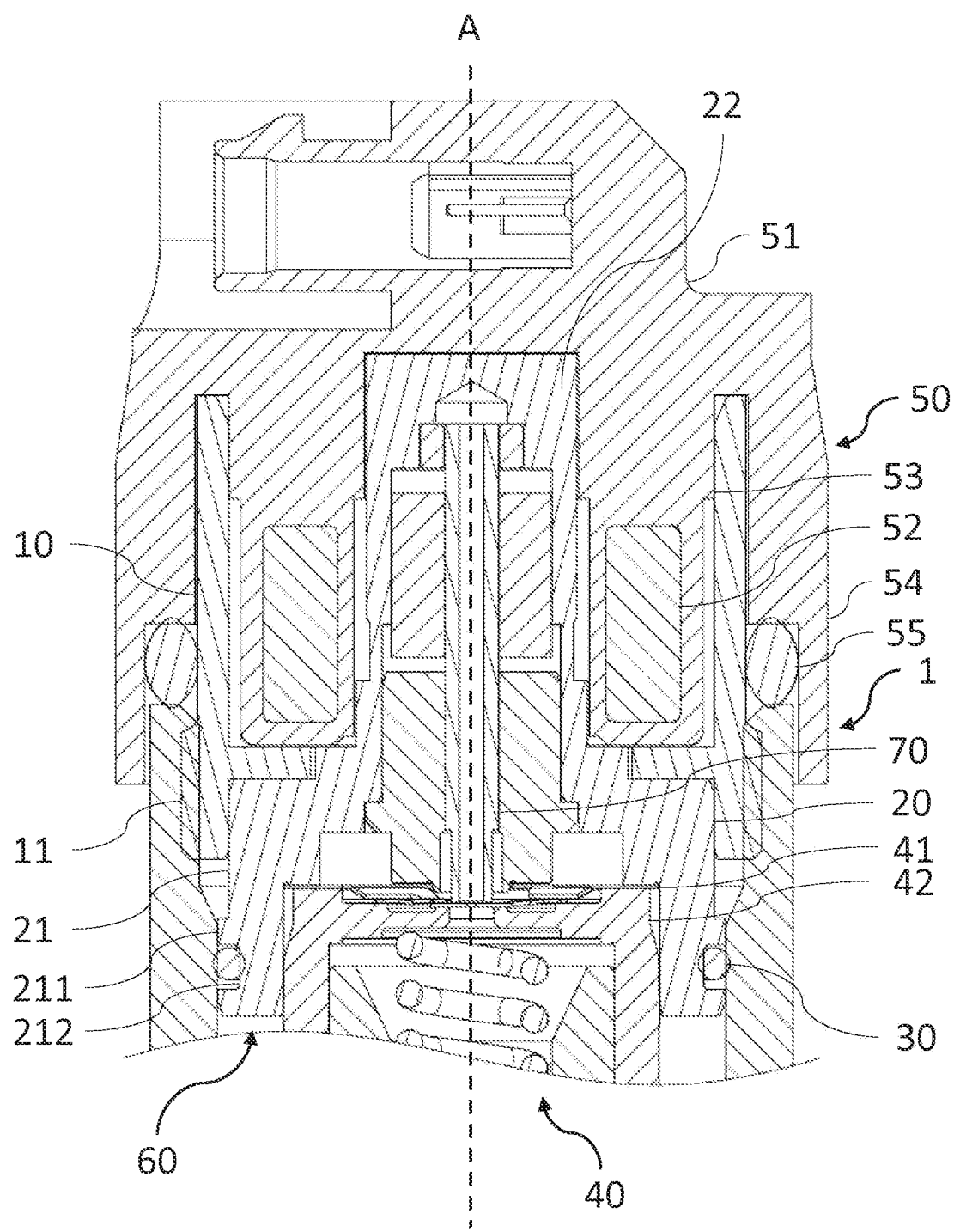
FIG. 1 shows a cross sectional side view of the insert arrangement according to one embodiment of the disclosure.

The present disclosure will be described more fully hereinafter with reference to the accompanying drawings, in which preferred embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. In the drawings, like numbers refer to like elements.

In the drawings and specification, there have been disclosed preferred embodiments and examples of the disclosure and, although specific terms are employed, they are used in a generic and descriptive sense only and not for the purpose of limitation, the scope of the disclosure being set forth in the following claims.

According to a first aspect, the disclosure relates to an insert arrangement 1 adapted for engaging with a solenoid arrangement 50 and for closing a valve cavity 60 of a damping arrangement. Such an insert arrangement 1 is illustrated in e.g., FIG. 1 which shows a cross sectional side view of the insert arrangement 1 according to one embodiment of the disclosure. The insert arrangement 1 may comprise a general elongated shape extending in a direction parallel to a first axis A. The first axis A may be a center axis A. A first axial end of the insert arrangement 1 can be inserted into a damping arrangement for closing a valve cavity 60 thereof. Moreover, the opposite axial end of the insert arrangement 1 may engage with a solenoid arrangement 50 when arranged to engage with the insert arrangement 1.

Generally, a solenoid arrangement 50 comprises a solenoid housing 51 and means 52 for generating a magnetic field, wherein said solenoid housing 51 is housing said means 52. Such means 52 may for example be one or more coils for conducting an electric current to generate said magnetic field. The solenoid arrangement 50 may comprise a first portion 53 in which the means 52 for generating a magnetic field are arranged. The first portion 53 may extend from an inner surface of the solenoid housing 51 in a direction substantially parallel to an axis. Said first portion 53 may be a portion of the housing 51. Said axis may be a center axis which, when the solenoid arrangement 50 is arranged to engage with the insert arrangement 1, is parallel to a center axis A of the insert arrangement 1. The first portion 53 may be adapted in shape and size to define a central opening for receiving a portion of the insert arrangement 1 when the solenoid arrangement 50 is arranged to engage with the insert arrangement 1. The solenoid arrangement 50 may further comprise a second portion 54 adapted in shape and size to engage with the damping arrangement so that the insert arrangement may close said valve cavity 60. Said second portion 54 may be a portion of the solenoid housing 51. Either or both of the first portion 53 and the second portion 54 may extend in a circumferential direction about the center axis. The second portion 54 may be located at a greater radial distance than the first portion 53. The first portion 53 and the second portion 54 may be adapted in shape and size to define a gap between them. The gap may allow a part or portion of the insert arrangement 1 to be received, such as a casing member 10.

The insert arrangement 1 is adapted for closing a valve cavity 60 of a damping arrangement. The insert arrangement 1 comprises an armature member 20 adapted in shape and size to provide a base portion 21 and an axial portion 22 extending out of the base portion in a direction parallel to a first axis A. The first axis A may be a center axis A of the insert arrangement 1. The base portion 21 is adapted to provide a mating surface 211 for mating with an inner wall of the valve cavity 60 when the insert arrangement 1 is arranged to close the valve cavity. By mating, it may be meant that a gap between the mating surface and the wall of the valve cavity is within a predetermined distance tolerance. The predetermined distance tolerance may be in the interval of 0.1-1 mm. The mating surface 211 may extend in a circumferential direction about the first axis A. The mating surface 211 may have a shape corresponding to a shape of the wall of the valve cavity 60. As an example, the wall of the valve cavity 60 may have a cylindrical shape in which case the mating surface 211 may have a cylindrical shape also.

The axial portion 22 is adapted to define an inner space for receiving and allowing an actuation member 70 to be axially moveable therein to interact with a valve arrangement 40 of the damping arrangement under influence of a magnetic field generated by the solenoid arrangement 50. One or more guiding portions may be adapted to be arranged in said inner space to guide the actuation member 70 to move therein between a retracted and extended position. The actuation member 70 may in the extended position engage with a first valve member 41 of a valve arrangement 40. The actuation member 70 may be displaced from the first valve member 41 in the retracted position. The actuation member 70 may be moveable between an extended position and a retracted position in response to the magnetic field generated by the solenoid arrangement 50.

The valve arrangement 40 may comprise a first valve member 41 adapted to be engageable with a first valve seat member 42. The first valve member 41 may be the first valve member 41 referenced above. The first valve member 41 may be adapted to be displaceable in a direction parallel to a center axis of the insert arrangement 1. The actuation member 70 may be displaceable to come in contact with the first valve member 41 to engage with the first valve seat 42. The first valve member 41 may be a spring shim comprising a first pair of spring shim portions axially moveable relative each other. The first valve member 41 may be at least locally attached between the first valve seat 42 and the armature member 20. The spring shim may comprise a second pair of spring shim portions axially moveable relative each other. The spring shim may comprise three or more spring shim portions axially moveable relative each other. The first valve seat member 42 may comprise a plurality of valve seat surfaces axially displaced relative each other to define a respective valve seat portion. Each spring shim portion may be adapted to abut with a respective valve seat portion.

Figure 2:
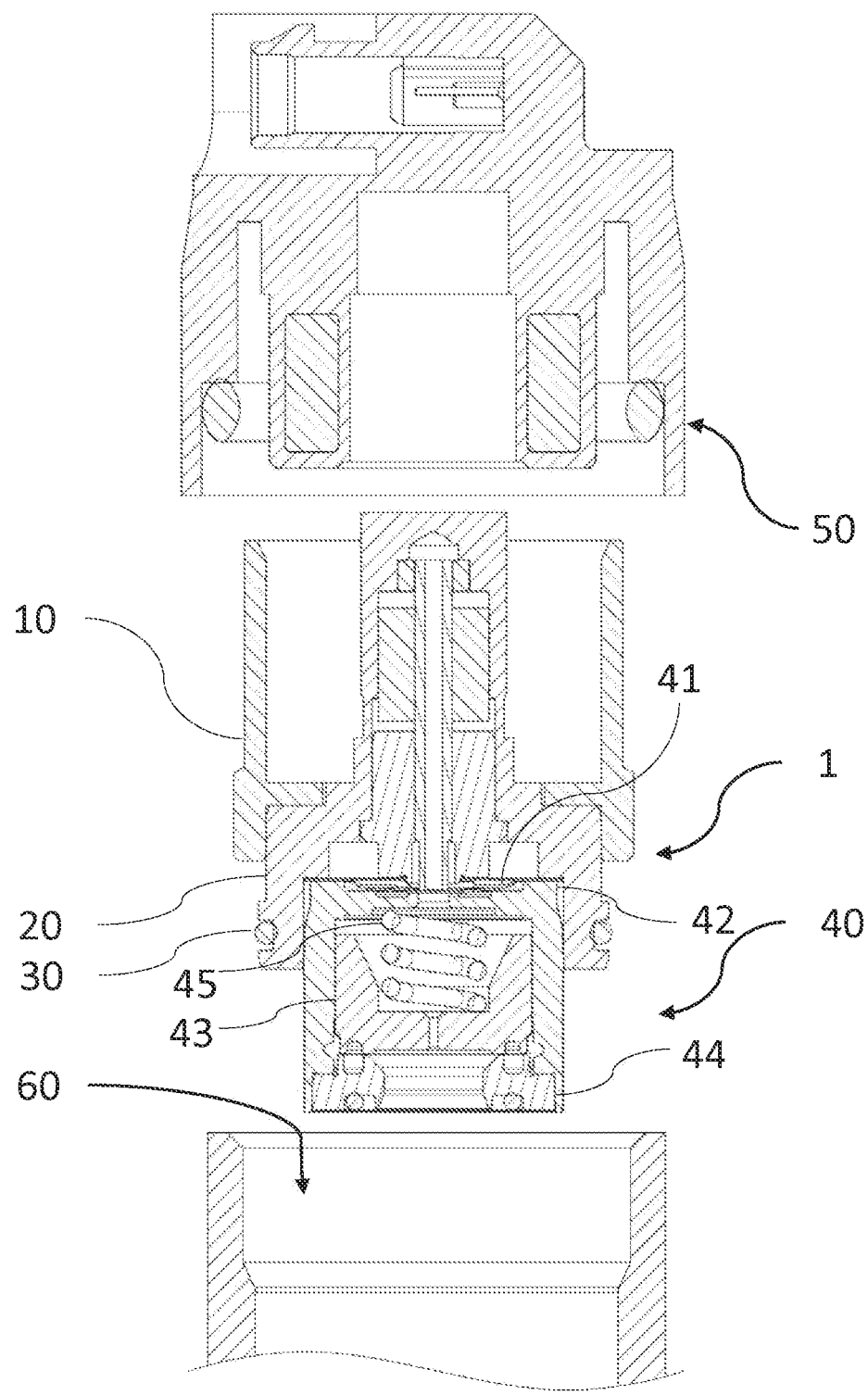
FIG. 2 shows a cross sectional exploded view of the insert arrangement according to one embodiment of the disclosure.

As shown in e.g., FIG. 2, the first valve seat member 42 may define an inner space. The first valve seat member 42 may comprise an opening leading into the inner space. The valve arrangement 40 may comprise a second valve member 43 adapted to be arranged to be moveable in said inner space between a first position and a second position. The valve arrangement 40 may comprise a second valve seat member 44. The second valve member 43 may in the second position be seated on the second valve seat member 44 when in the second position and be displaced therefrom when in the first position. The second valve member 43 may be adapted to move axially between the first position and the second position. The valve arrangement 40 may comprise a biasing member 45 for biasing the second valve member 42 to move towards the second valve seat member 44. The biasing member 45 may be a helical spring with one axial end being arrange in contact with the second valve seat member 43 while the other axial end of the helical spring is arranged in contact with the first valve seat member 42. The second valve member 43 may comprise a through-hole connecting to opposite surfaces of the second valve member 43. The through-hole may enable hydraulic fluid flow through the second valve member 43. The second valve seat member 44 may comprise a through-hole connecting two opposite sides of the second valve seat member 44.

As shown in e.g., FIG. 1, the insert arrangement 1 further comprises a casing member 10 adapted to extend around the axial portion 22 to define a receiving space between the axial portion 22 and the casing member 10. The casing member 10 and the armature member 20 may be separate parts and can be assembled by inserting the armature member 20 into the casing member 10.

The casing member 10 may comprise a generally cylindrical shape. The casing member 10 may define an inner space. A portion of the inner space may constitute the receiving space when the armature member is arranged to extend into the casing member 10. The solenoid arrangement 50 is adapted to be at least partly arrangeable in said receiving space when arranged to the insert arrangement 1.

The casing member 10 is further adapted with a magnetically conducting material for substantially closing a magnetic field generated by the solenoid arrangement 50. Such magnetic materials may include any applicable metallic type material and nonmetallic type material.

The casing member 10 may have a first axial opening and a second axial opening into the inner space. The casing member 10 may comprise an inner receiving portion adapted in shape and size to receive the armature member 20 when inserted into the casing member 10. The inner receiving portion may be adapted with a planar surface with a surface normal parallel to a center axis of the insert arrangement 1. The inner receiving portion may define a through hole with a side wall adapted in shape and size to mate with a corresponding surface of the armature member 20. The receiving space of the insert arrangement 1 may be adapted in size and shape for receiving the solenoid arrangement 50, and preferably in particular the first portion wherein the means for generating magnetic field is arranged. The axial portion 22 of the armature member 20 may be adapted to extend in the inner space defined by the first portion 53 of the solenoid arrangement 50. The axial portion 22 and the first portion 53 of the solenoid arrangement 50 may engage in a close fit manner.

A sealing member 55 may be provided to seal between the solenoid arrangement 50 and the casing member 10 of the insert arrangement 1 or to seal between the solenoid arrangement 50 and the cavity wall of the damping arrangement.

The sealing member 55 may be arranged at an outer side of the casing member 10 after assembly.

The armature member 20 is adapted to be secured or securable to the valve cavity wall of the damping arrangement when closing the insert arrangement 1 is arranged to close the valve cavity 60. For this, the insert arrangement 1 comprises fixating means 11 for fixating the armature member 20 to the damping arrangement. The fixating means 11 may be arranged on the casing member 10. Thus, the armature member 20 may be secured to the valve cavity wall via the casing member 10 to which it is coupled, which casing member 10 is secured to the valve cavity wall via said fixating means of the casing member 10. Preferably, the fixating means 11 include threads arranged on an outer surface of the casing member 10 which are adapted to engage with corresponding threads arranged at an inner wall of the valve cavity 60. The mating surface 211 is axially located between an insert end of the insert arrangement 1 and said fixating means 11.

The advantage of the fixating the armature member 20 to the damping arrangement by means of the casing member 10 in this fashion is that it allows the armature member 20 to be manufactured in one piece which reduces manufacturing complexity and thereby associated costs. Moreover, it also provides the mating surface axially inward from the fixating means. This may enable a tighter mating between the mating surface 211 and the valve cavity wall. It may also enable less strict tolerance between the mating surface 211 and the valve cavity wall, as a sealing member 30 may be arranged in a groove 212 to hinder hydraulic fluid leakage. An additional advantage is that it may facilitate assembly since the casing member 10 is more accessible during assembly. Conventionally, the fixating means, such as threads, are arranged at the base portion 21 of the armature member 20 and needs to be carefully mounted in place without any direct line of sight. The present disclosure thus provides a better solution for securing the insert arrangement 1 to a damping arrangement.

As indicated in e.g., FIGS. 1 and 2, the insert arrangement 1 may be further adapted with a groove 212 in the mating surface 211 for receiving a sealing member 30 therein. The sealing member 30 is adapted to hinder hydraulic fluid from leaking out of the valve cavity 60 when the insert arrangement 1 is arranged to close the valve cavity. The groove 212 may extend in a circumferential direction along the mating surface 211 around the base portion 21 of the armature member 20. The base portion 21 may comprise a curved portion between the mating surface 211 and a bottom side of the base portion 21. By this, the armature member 20 may be more easily guided into the valve cavity 60 of the damping arrangement.

According to one embodiment, the base portion 21 and the axial portion 22 are formed as a single part. The axial portion 22 and the base portion 21 may respectively comprise generally cylindrical shapes. The axial portion 22 and the base portion 21 may be arranged concentrically.

Moreover, according to one embodiment, the casing member 10 is a separate part from the armature member 20. The casing member 10 may be made from a magnetically conducting material. The armature member 20 may be made from a material different from the casing member 10.

The fixating means 11 comprise threads adapted to engage with corresponding threads arranged on the inner wall of the valve cavity 60.

The insert arrangement 1 further comprises a sealing member 30 adapted to be arranged in the groove 212 and to hinder hydraulic fluid from leaking out of the valve cavity 60 when the insert arrangement 1 is arranged to close the valve cavity 60.

The casing member 10 and the base portion 21 of the armature member 20 are adapted with substantially cylindrical geometry. The casing member 10 and the base portion 21 are characterized by respective outer diameters wherein the outer diameter of the casing member 10 is larger than the outer diameter of the base portion 21.

According to one embodiment, the casing member 10 is adapted to engage with the base portion 21 of the armature member 20 in a press fit manner. This feature is however an optional feature but indeed facilitates the casing member 10 to secure the armature member 20 in place when the insert arrangement 1 is arranged to close the valve cavity 60 of the damping arrangement.

Figure 3:
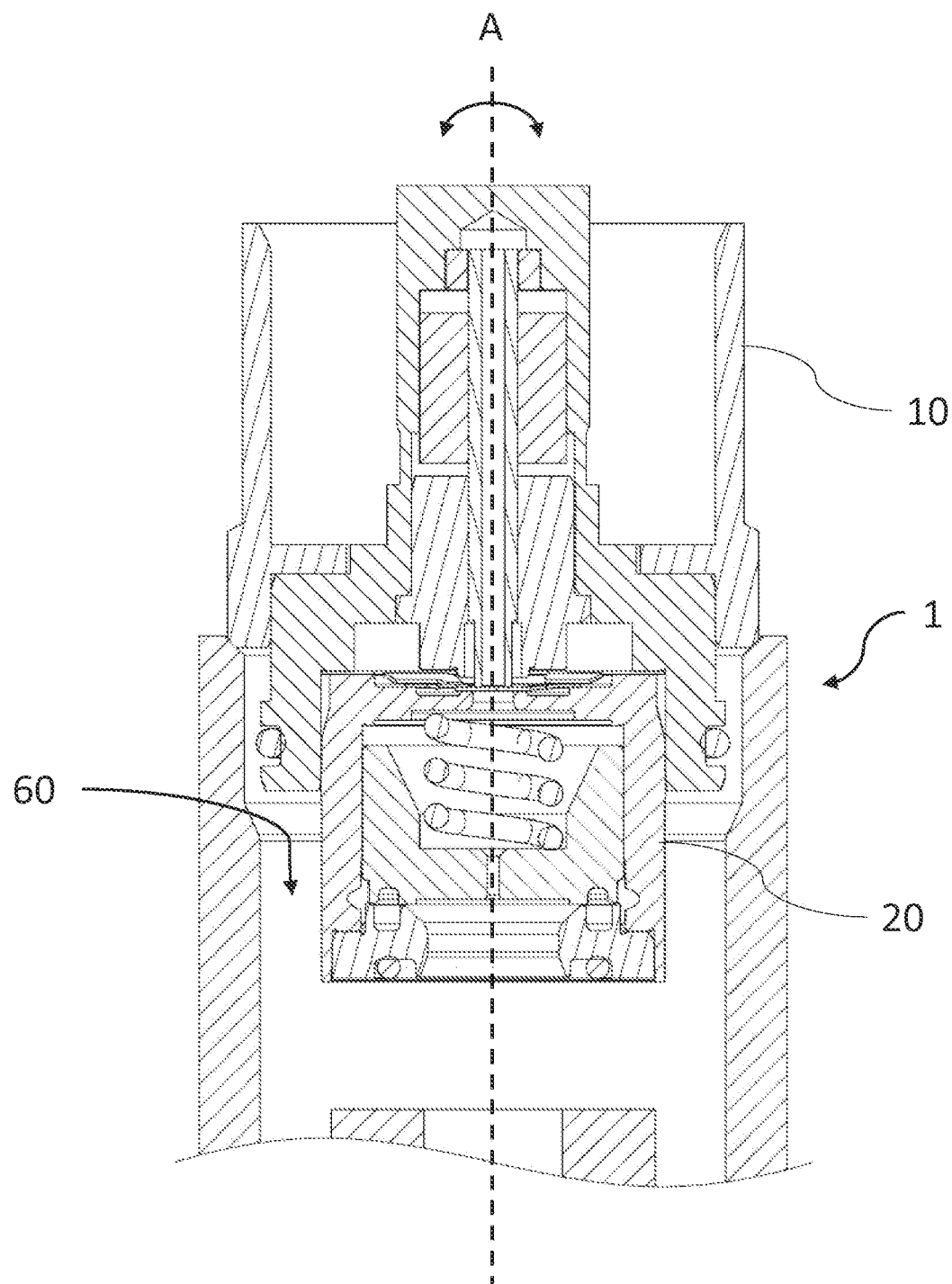
FIG. 3 shows a cross sectional side view of the insert arrangement according to one embodiment of the disclosure.
Figure 4:
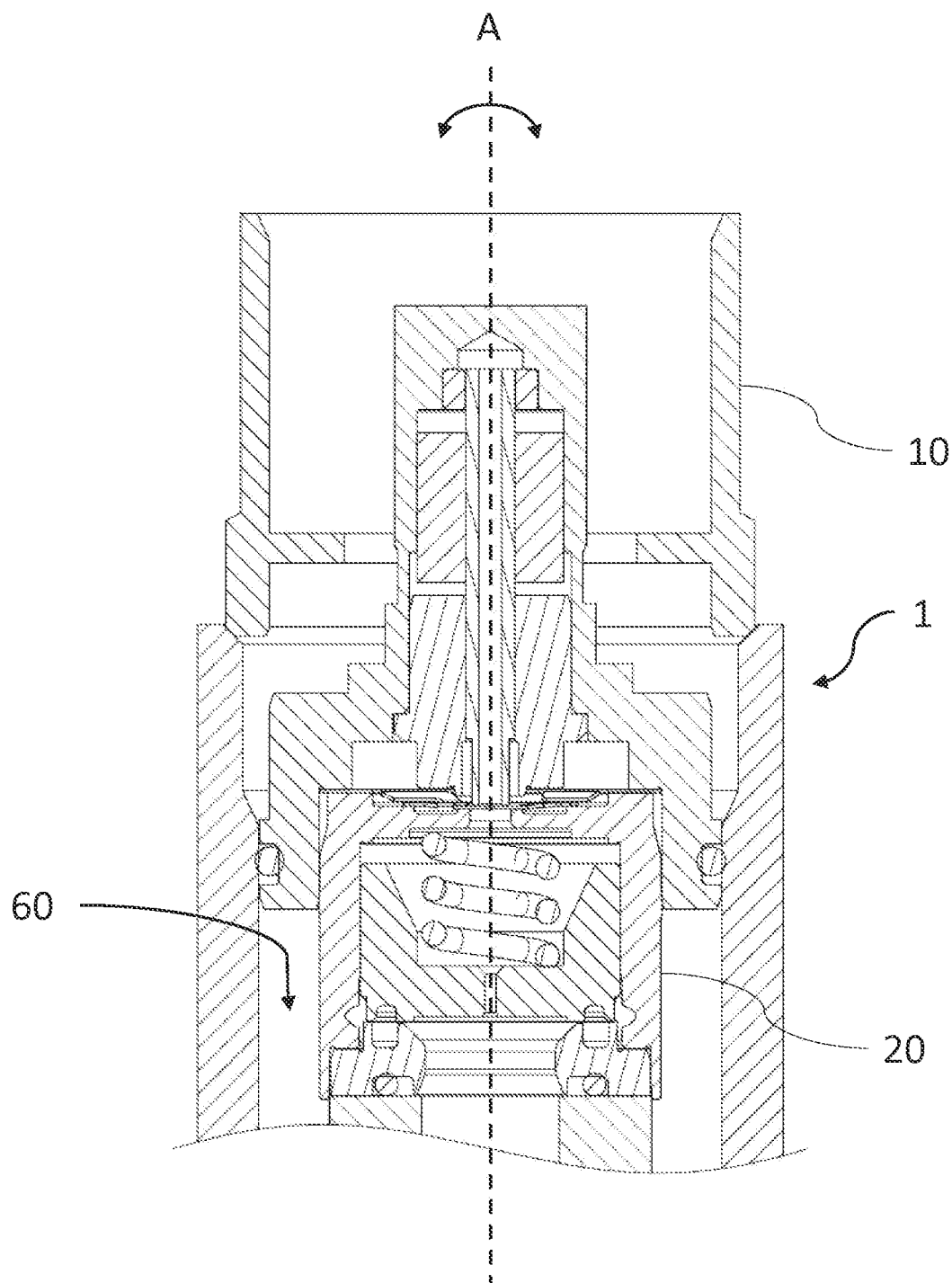
FIG. 4 shows a cross sectional side view of the insert arrangement according to one embodiment of the disclosure.

FIGS. 3 and 4 show two different ways of assembling the insert arrangement 1 to close the valve cavity 60 of the damping arrangement. According to one embodiment, the armature member 20 and the casing member 10 are first assembled before the insert arrangement 1 is arranged to the damping arrangement 1 to close the valve cavity 60. The casing member 10 is then rotated to secure the armature member 10. This is shown in FIG. 3. Alternatively, the armature member 20 is first arranged to the damper device in the valve cavity 60 and thereafter the casing member 10 is arranged to secure the armature member 20 so that the insert arrangement closes the valve cavity 60 of the damping arrangement. This is shown in FIG. 4. An assembly element may be inserted to protect the threads of the damping arrangement during insertion of the insert arrangement 1 and may be removed before the casing member 10 is rotated to fixate the insert arrangement 1 to the damping arrangement.

Figure 5:
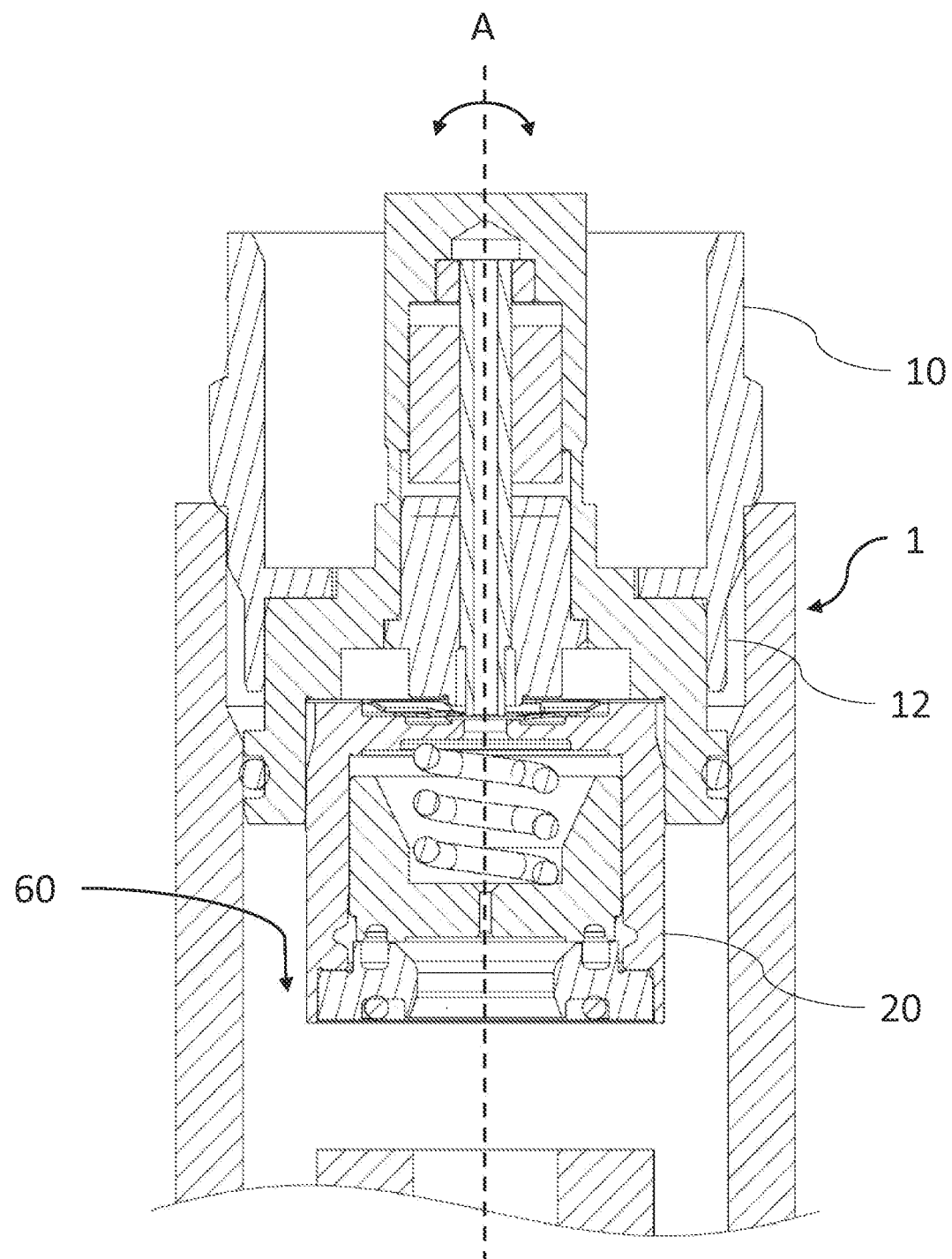
FIG. 5 shows a cross sectional side view of the insert arrangement according to one embodiment of the disclosure.

FIG. 5 shows an embodiment of the disclosure wherein the casing member comprises an engaging portion 12. The engaging portion 12 is adapted in shape and size to facilitate insertion of the insert arrangement 1 into the valve cavity 60. As exemplified, the engaging portion 12 is characterized by a smaller outer diameter than a second portion of the casing member 10. The engaging portion 12 may have a tapered portion from the engaging portion and the second portion of the casing member 12. The engaging portion 12 may be adapted in shape and size to correspond to an inner shape of the valve cavity wall of the damping arrangement. By this, the insert arrangement 1 may be more easily inserted into a valve cavity 60. Moreover, it may improve stability of the insert arrangement 1 as well.

Figure 6:
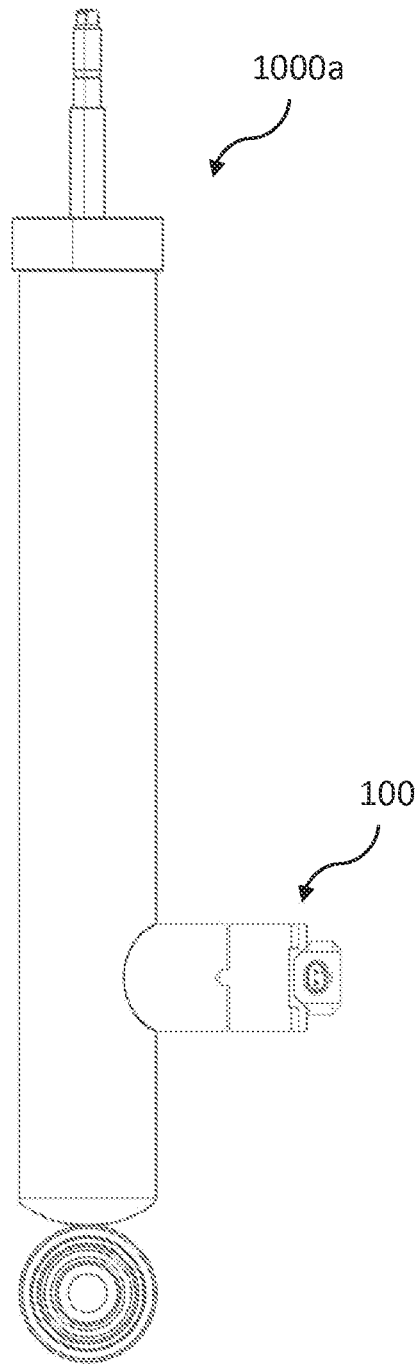
FIG. 6 shows a shock absorber according to one embodiment of the disclosure.

FIG. 6 shows a first embodiment of a damping arrangement such as a shock absorber 1000a comprising a valve device 100. The valve device 100 comprises a valve cavity and a valve arrangement and an insert arrangement 1 according to the disclosure. A solenoid arrangement is also shown in FIG. 5. The valve device 100 may be fluidly connected to a damping chamber of the shock absorber for enabling control of damping characteristics during compression and/or rebound.

Figure 7:
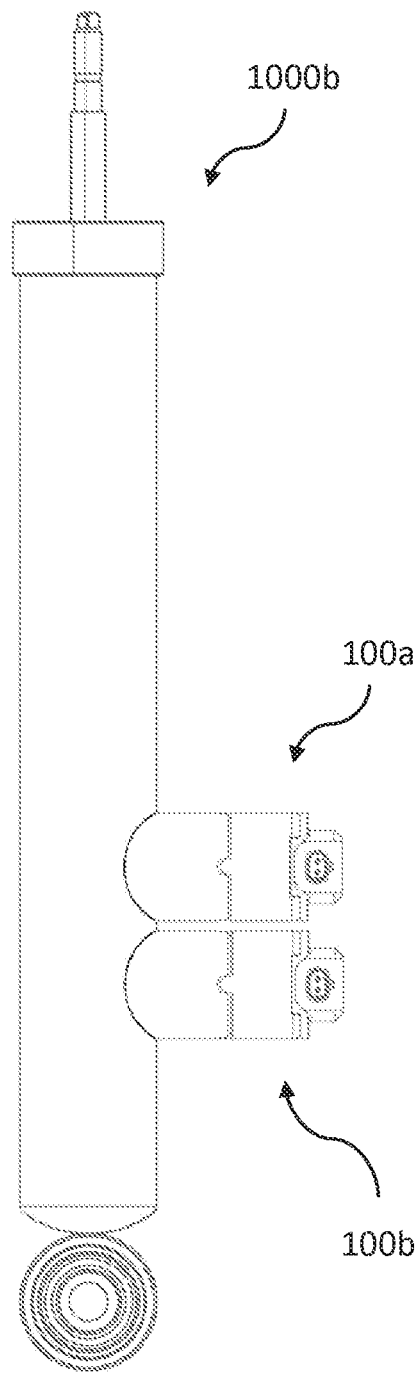
FIG. 7 shows a shock absorber according to one embodiment of the disclosure.

FIG. 7 shows a second embodiment of a damping arrangement such as a shock absorber 1000b comprising two valve devices 100a, 100b. One or both of the valve devices 100 comprises a valve arrangement and an insert arrangement 1 according to the disclosure. Respective solenoid arrangements are also shown in FIG. 6. One of the two valve devices 100a, 100b may be fluidly connected to the shock absorber to control damping characteristics during compression and the other of the two valve devices 100a, 100b may be fluidly connected to a damping chamber of the shock absorber for enabling control of damping characteristics during rebound.

Figure 8:
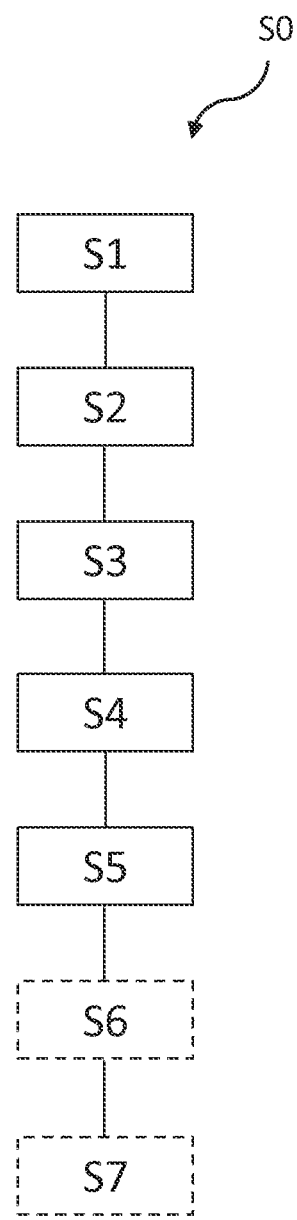
FIG. 8 shows a flow chart of a method of assembling the insert arrangement according to one embodiment of the disclosure.

FIG. 8 shows a flow chart of a method of assembling a damping arrangement, comprising the steps of: providing S1 a damping arrangement adapted with a valve cavity 60; providing S2 an insert arrangement 1 comprising an armature member 20 and a valve arrangement 40; inserting S3 the insert arrangement 1 into the valve cavity 60 such that a mating surface 211 of a base portion 21 of the armature member 20 mates with an inner wall of the valve cavity 60, thereby closing the valve cavity 60 in a closing position; fixating S4 the insert arrangement 1 in the closing position by means of fixating means 11 provided on a casing member 10 of the insert arrangement 1 adapted for engaging with threads provided on an inner wall of the valve cavity 60; arranging S5 a solenoid arrangement 50 in a receiving space formed between the casing member 10 and an axial portion 22 extending out of the base portion 21 of the armature member 20.

The method further comprises the step of providing S6, prior to the step of inserting the insert arrangement 1 into the valve cavity 60, a sealing member 30 in a groove located in the mating surface 211.

The method further comprises the step of providing S7, prior to inserting the insert arrangement 1 in the valve cavity, an assembly element into the valve cavity to cover said threads in the valve cavity 60 and removing the assembly element before fixating the insert arrangement 1 in the closing position by means of said fixating means 11.

In the drawings and specification, there have been disclosed preferred embodiments and examples of the disclosure and, although specific terms are employed, they are used in a generic and descriptive sense only and not for the purpose of limitation, the scope of the disclosure being set forth in the following claims.

The invention claimed is:

1. An insert arrangement for engaging with a solenoid arrangement and for closing a valve cavity of a damping arrangement, the insert arrangement comprising:
    an armature member adapted in shape and size to provide a base portion and an axial portion extending out of the base portion in a direction parallel to a first axis, wherein
    the base portion is adapted to provide a mating surface for mating with an inner wall of the valve cavity when the insert arrangement is arranged to close the valve cavity,
    the axial portion is adapted to define an inner space for receiving and allowing an actuation member to be axially moveable therein to interact with a valve arrangement of the damping arrangement under influence of a magnetic field generated by the solenoid arrangement,
    a casing member adapted to extend around the axial portion to define a receiving space between the axial portion and the casing member, and the solenoid arrangement including a first portion at least partly arrangeable in said receiving space, the casing member further adapted with a magnetically conducting material for substantially closing a magnetic field generated by the solenoid arrangement, the solenoid arraignment including a second portion circumscribing the first portion with a gap therebetween, the casing member being at least partially positioned in the gap and
    fixating means for fixating the armature member to the damping arrangement, wherein said fixating means are arranged on the casing member,
    said mating surface being axially located between an insert end of the insert arrangement and said fixating means.

2. The insert arrangement according to claim 1, further adapted with a groove in the mating surface for receiving a sealing member therein, which sealing member is adapted to hinder hydraulic fluid from leaking out of the valve cavity when the insert arrangement is arranged to close the valve cavity.

3. The insert arrangement according to claim 1, wherein the base portion and the axial portion are formed as a single part.

4. The insert arrangement according to claim 1, wherein the casing member is a separate part from the armature member.

5. The insert arrangement according to claim 1, wherein the fixating means comprise threads adapted to engage with corresponding threads arranged on the inner wall of the valve cavity.

6. The insert arrangement according to claim 2, further comprising a sealing member adapted to be arranged in the groove and to hinder hydraulic fluid from leaking out of the valve cavity when the insert arrangement is arranged to close the valve cavity.

7. The insert arrangement according to claim 1, wherein the casing member and the base portion of the armature member are adapted with substantially cylindrical geometry, wherein an outer diameter of the casing member is larger than an outer diameter of the base portion.

8. The insert arrangement according to claim 7, wherein the base portion and the axial portion are concentrical.

9. The insert arrangement according to claim 1, wherein the casing member is adapted to engage with the base portion of the armature member in a press fit manner.

10. The insert arrangement according to claim 1, wherein the fixation means are adapted for securing the casing member to the inner wall of the valve cavity.

11. A damping arrangement comprising:
    a valve cavity;
    an insert arrangement according to claim 1 arranged to close the valve cavity;
    a solenoid arrangement arranged at least partly in the receiving space of the insert arrangement;
    a valve arrangement; and
    an actuation member axially moveable in the inner space of the axial portion of the armature member to interact with the valve arrangement under influence of a magnetic field generated by the solenoid arrangement.

12. The damping arrangement according to claim 11, further comprising a sealing member arranged in a groove or the groove located in the mating surface of the base portion of the armature member for hindering hydraulic fluid from leaking out of the valve cavity when the insert arrangement is arranged to close the valve cavity.

13. A method of assembling a damping arrangement, comprising the steps of:
    providing a damping arrangement adapted with a valve cavity;
    providing an insert arrangement comprising an armature member and a valve arrangement, said valve arrangement comprising a first valve seat member and a first valve member adapted to be engageable with the first valve seat member;
    inserting the insert arrangement into the valve cavity such that a mating surface of a base portion of the armature member mates with an inner wall of the valve cavity, thereby closing the valve cavity in a closing position;
    fixating the insert arrangement in the closing position by means of fixating means provided on a casing member adapted for engaging with threads provided on the inner wall of the valve cavity;

arranging a first portion of a solenoid arrangement in a receiving space formed between the casing member and an axial portion extending out of the base portion of the armature member, and positioning at least a portion of the casing within a gap located between the first portion and a second portion of the solenoid arrangement that circumscribes the first portion.

14. The method according to claim 13, further comprising the step of providing, prior to the step of inserting the insert arrangement into the valve cavity, a sealing member in a groove located in the mating surface.

* * * * *